(12) United States Patent
Kato et al.

(10) Patent No.: US 6,607,806 B2
(45) Date of Patent: Aug. 19, 2003

(54) MAGNETIC RECORDING MEDIUM

(75) Inventors: Kazuo Kato, Kanagawa (JP); Kazuko Hanai, Kanagawa (JP); Mikio Ono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 108 days.

(21) Appl. No.: 09/732,708

(22) Filed: Dec. 11, 2000

(65) Prior Publication Data

US 2001/0008713 A1 Jul. 19, 2001

(30) Foreign Application Priority Data

Dec. 9, 1999 (JP) ............................................. 11-350459

(51) Int. Cl.$^7$ ................................................. G11B 5/71
(52) U.S. Cl. ..................... 428/141; 428/328; 428/409; 428/425.9; 428/694 BP; 428/694 BA; 428/694 BR; 428/694 BU; 428/694 BN; 428/900
(58) Field of Search ................................. 428/141, 328, 428/409, 425.9, 900, 694 BP, 694 BA, 694 BR, 694 BU, 694 BN

(56) References Cited

U.S. PATENT DOCUMENTS

| | | | | |
|---|---|---|---|---|
| 4,675,250 A | * | 6/1987 | Kanai et al. | |
| 5,445,881 A | * | 8/1995 | Irie | |
| 5,604,028 A | * | 2/1997 | Hirama et al. | |
| 5,904,979 A | * | 5/1999 | Kakuishi et al. | |
| 5,922,483 A | * | 7/1999 | Takahashi et al. | |
| 5,955,189 A | * | 9/1999 | Ejiri et al. | |

* cited by examiner

*Primary Examiner*—Stevan A. Resan
(74) *Attorney, Agent, or Firm*—Sughrue Mion, PLLC

(57) ABSTRACT

A magnetic recording medium comprises: a support; and at least one magnetic layer comprising a binder and a ferromagnetic alloy powder including Fe, wherein the magnetic recording medium has a surface scratch depth of 370 nm to 460 nm, and has a surface lubricant index of 4 to 11.

18 Claims, No Drawings

MAGNETIC RECORDING MEDIUM

FIELD OF THE INVENTION

The present invention relates to a magnetic recording medium which shows less abrasion of a head and an excellent traveling property and durability.

BACKGROUND OF THE INVENTION

In VTR and computer drive in recent years, the increase of data transfer rate by increasing the relative speed of a magnetic recording medium to a magnetic head has been advanced conjointly with the improvement of recording capacity. For increasing recording capacity, the improvement of recording density is necessary, hence a magnetic recording medium which is excellent in electromagnetic characteristics is demanded. Of the systems which have achieved the realization of higher capacity and the increase of data transfer rate, above all, VTR for broadcasting mounts expensive assembled heads. Since the relative speed of head/tape of such a system becomes high correspondingly to the increase of data transfer rate, the abrasion of a magnetic head has a great influence on the maintenance fee and running cost of the system. Therefore, a magnetic recording medium which shows less abrasion of head and a longer life of head has been strongly desired.

In general, when head abrasion is reduced, still durability and the resistance to head staining are also lowered in many cases. Various methods are known for reducing head abrasion, e.g., a method of changing the kind of the abrasive in a magnetic layer to one having lower abrading property, a method of reducing the amount of an abrasive, a method of adjusting the surface oxide layer composition of a ferromagnetic metal powder, a method of optimizing the kneading strength at the time of producing a magnetic solution, and a method of increasing the amount of a lubricant. However, these methods cannot fundamentally improve the above trade-off relationship, therefore the above demand cannot be satisfied.

SUMMARY OF THE INVENTION

Accordingly, an object of the present invention is to provide a magnetic recording medium which shows less head abrasion and is excellent in still durability and resistance to head staining.

The present invention has been achieved by a magnetic recording medium comprising a support having provided thereon at least one magnetic layer comprising a ferromagnetic alloy powder with Fe as a main component dispersed in a binder, wherein the scratch depth of the surface of the magnetic recording medium is from 370 to 460 nm, the surface lubricant index of the magnetic recording medium is from 4 to 11, and preferably the average long axis length of said ferromagnetic alloy powder is from 30 to 150 nm.

DETAILED DESCRIPTION OF THE INVENTION

The object of the present invention, i.e., the improvement of head abrasion and still characteristics, can be attained by controlling the scratch depth of the surface of a magnetic recording medium to from 370 to 460 nm and the surface lubricant index of a magnetic recording medium to from 4 to 11.

The surface scratch depth of a magnetic recording medium can be obtained by scratching the surface of a test sample to make a streak on the surface of a magnetic recording medium with HEIDON scratch tester and measuring the depth of the streak with an optical profiler: TOPO-3D (a product of WYKO Co., U.S.A.). The surface of a magnetic recording medium in the present specification is the surface of the side on which a magnetic layer is provided.

If the scratch depth of a magnetic recording medium exceeds 460 nm, the coated layer becomes soft and scratched powders are generated due to sliding with a magnetic head, as a result, resistance to head staining is deteriorated and clogging of a head is liable to occur. While if the scratch depth is less than 370 nm, the coated layer becomes hard and brittle, still durability is deteriorated.

For controlling the scratch depth, e.g., a method of optimizing three component ratio of binder resins (a vinyl chloride resin/a polyurethane resin/a hardening agent), a method of optimizing P/B ratio (the ratio of an inorganic powder such as a magnetic substance and a binder resin), a method of increasing the dispersing property of a magnetic powder by using a resin to which a polar functional group has been introduced, or a method of heightening elastic modulus and glass transition point (Tg) of a binder resin can be utilized. It is also possible to control scratch depth by changing calendering moldability by the prescription amount of a lubricant. Further, scratch depth can be controlled by a method of changing the main agent and the amount of a solvent for kneading to optimize the degree of kneading at the time of preparing a magnetic coating solution, a method of changing calendering conditions such as temperature, pressure and the hardness of a calender roll, and a method of introduction of a metal calender roll.

A surface lubricant index of a magnetic recording medium is an index showing the amount of a lubricant on the surface of a medium. A substance on the surface can be measured by Auger electron spectroscopy. An element existing in the depth of several tens angstrom (Å) from the surface can be analyzed by Auger electron spectroscopy, and it is possible to know the substance present on the extreme surface and the stoichiometric relationship.

In the case of a magnetic recording medium, the amounts of the lubricant and the binder resin present on the surface of a magnetic layer can be expressed by the ratio of the amount of C element resulting therefrom to the amount of Fe element resulting from the magnetic substance (C/Fe=A). A surface lubricant index is expressed as A/B by obtaining the ratio of the amount of C element (the binder component on the surface), which is measured after removal of lubricant from the recording medium, to the amount of Fe element (C/Fe=B).

The removal of a lubricant from a recording medium can be effected by immersing a medium in n-hexane to extract and remove the lubricant not adsorbed onto the magnetic substance, and then subjecting the lubricant adsorbed onto the magnetic substance to reaction with a silylating agent to be derived, extracted and removed.

The surface lubricant index of the magnetic recording medium according to the present invention is preferably from 4.5 to 11, more preferably 5 to 11, particularly preferably from 4.5 to 10.5. When the surface lubricant index is smaller than 4, the head abrasion amount abruptly increases, as a result the life of a head becomes short. While when the surface lubricant index exceeds 11, the friction coefficient sharply increases and the traveling property becomes unstable.

As is apparent from the Example described later, a surface lubricant index does not necessarily correlate with the above-described scratch depth and they are each thought to be an independent variable. However, as a specific means to control a surface lubricant index, the selection of the kind and the amount of the lubricant to be extracted by n-hexane and the same means of controlling a scratch depth as described above are applied.

The lubricants which contribute to the control of a surface lubricant index are selected from among the additives described later, and fatty acids, fatty acid esters and alcohols are particularly preferably used.

The central plane average surface roughness (SRa) of the magnetic layer according to the present invention is a value obtained by the measurement by an optical profiler: TOPO-3D. SRa is generally from 0.5 to 5.0 nm in the present invention, preferably 4 nm or less, and still more preferably 3 nm or less. If SRa exceeds 5.0 nm, the spacing loss between the magnetic recording medium and the head becomes large, as a result, output reduces and noise increases, therefore, the function of the magnetic recording medium of the present invention cannot be exhibited sufficiently. If Ra is less than 0.5 nm, the magnetic layer is generally liable to be damaged by the magnetic head.

The magnetic layer of the magnetic recording medium according to the present invention generally has a coercive force (Hc) of $1.11 \times 10^5$ A/m or more, although the optimal value varies according to recording/reproducing systems. For the realization of further higher recording density, $(1.59$ to $2.79) \times 10^5$ A/m is preferred. The upper limit is unclear but it is thought to be about $2.79 \times 10^5$ A/m from the examination using the recording head of (Bs: 1.8T (tesla)).

Ferromagnetic Metal Powder

Ferromagnetic alloy powders which can be used in the present invention are preferably ferromagnetic alloy powders containing α-Fe as a main component. These ferromagnetic powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B. In particular, it is preferred to contain at least one of Al, Si, Ca, Y, Ba, La, Nd, Sm, Co, Ni and B, in addition to α-Fe, and more preferably at least one of Co, Y, Al, Nd and Sm in addition to α-Fe. The content of Co is preferably from 0 to 40 atomic %, more preferably from 5 to 35 atomic %, and most preferably from 10 to 35 atomic %, the content of Y is preferably from 1.5 to 12 atomic %, more preferably from 3 to 10 atomic %, and most preferably from 3 to 9 atomic %, the content of Al is preferably from 1.5 to 13 atomic %, more preferably from 3 to 11 atomic %, and most preferably from 4 to 10 atomic %, each based on Fe. These ferromagnetic powders may be previously treated with the later described dispersant, lubricant, surfactant, and antistatic agent before dispersion. Specific examples thereof are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014.

Ferromagnetic alloy powders may contain a small amount of a hydroxide or an oxide. Ferromagnetic alloy powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium borohydride, hypophosphite, or hydrazine, to effect reduction; and a method comprising evaporating a metal in a low pressure inert gas to obtain a fine powder. The thus-obtained ferromagnetic alloy powders may be subjected to well-known gradual oxidization treatment, e.g., a method comprising immersing the powders in an organic solvent, then drying; a method comprising immersing the powders in an organic solvent, then charging an oxygen-containing gas to form oxide layers on the surfaces thereof and drying; and a method comprising forming surface oxide layers on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of generally from 40 to 80 m²/g, preferably from 45 to 70 m²/g. When the specific surface area is 40 m²/g or less, noise increases and when 80 m²/g or more, good surface property is obtained with difficulty, which is not preferred. Ferromagnetic alloy powders which can be preferably used in the magnetic layer according to the present invention have a crystallite size of generally from 80 to 210 Å, preferably from 100 to 200 Å, and more preferably from 110 to 190 Å. The average length of the long axis of ferromagnetic alloy powders is preferably from 30 to 150 nm, and more preferably from 30 to 140 nm. Ferromagnetic alloy powders preferably have an acicular ratio of from 3 to 15, more preferably from 5 to 12. Ferromagnetic alloy powders have a saturation magnetization ($\sigma_s$) of generally from 100 to 200 A•m²/kg, and preferably from 120 to 180 A•m²/kg. Ferromagnetic alloy powders having a long axis length of from 30 to 150 nm are preferably used in the present invention for obtaining a magnetic recording medium having a high C/N ratio.

Ferromagnetic alloy powders preferably have a water content of from 0.01 to 2 mass %. The water content of ferromagnetic alloy powders is preferably optimized by selecting the kinds of binders. The pH of ferromagnetic alloy powders is preferably optimized by the combination with the binder to be used. The pH range is from 4 to 12, preferably from 6 to 10. Ferromagnetic alloy powders may be surface-treated with Al, Si, P or oxides thereof, if necessary. The amount of these compounds is from 0.1 to 10 mass % based on the ferromagnetic alloy powders. Adsorption of a lubricant, e.g., fatty acid, becomes 100 mg/m² or less by surface treatment, which is, therefore, preferred.

Soluble inorganic ions, e.g., Na and Ca, are sometimes contained in ferromagnetic alloy powders. It is preferred substantially not to contain such soluble inorganic ions. The content of soluble Na and soluble Ca is preferably 10 ppm or less.

Ferromagnetic alloy powders for use in the present invention preferably have less voids and the value thereof is 20 vol % or less, more preferably 5 vol % or less. The shape of ferromagnetic alloy powders is not particularly limited, and any shape such as an acicular shape, an ellipsoidal shape or a spindle shape may be used so long as it satisfies the above-described properties as to particle sizes.

SFD (Switching Field Distribution) of the ferromagnetic alloy powder itself is preferably small, preferably 0.8 or less. It is necessary to make Hc distribution of ferromagnetic alloy powders narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in ferromagnetic alloy powders good and preventing sintering are effective methods for ferromagnetic alloy powders.

Binder

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of about 50 to 1,000 can be used in the present invention.

Examples thereof include polymers or copolymers containing as a constituting unit the following compound, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal or vinyl ether; polyurethane resins and various rubber resins. Examples of thermosetting resins and reactive resins which can be used in the present invention include phenol resins, epoxy resins, polyurethane curable resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook,* published by Asakura Shoten. It is also possible to use well-known electron beam curable resins in each layer. Examples of these resins and producing methods are disclosed in detail in JP-A-62-256219 (the term "JP-A" as used herein means an "unexamined published Japanese patent application"). These resins can be used alone or in combination. Examples of preferred combinations include combinations of at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, and combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal), —OH, —NR$_2$, —N$^+$R$_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555, and 400X-110A (manufactured by Nippon Zeon Co., Ltd.), Nippollan N2301, N2302, and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink. Co., Ltd.), Vylon UR8200, UR8300, UR8700, RV530, and RV280 (manufactured by Toyobo Co., Ltd.), Daipheramine 4020, 5020, 5100, 5300, 9020, 9022, and 7020 (manufactured by Dainichi Seika K.K.), MX5004 (manufactured by Mitsubishi Kasei Corp.), Sunprene SP-150 (manufactured by Sanyo Chemical Industries Co. Ltd.), Salan F310 and F210 (manufactured by Asahi Chemical Industry Co., Ltd.), etc.

The amount of the binder for use in the magnetic layer according to the present invention is from 5 to 50 mass %, preferably from 10 to 30 mass %, based on the amount of the magnetic powder. When vinyl chloride resins are used, the amount thereof is from 5 to 30 mass %, when polyurethane resins are used, the amount thereof is from 2 to 20 mass % and also it is preferred polyisocyanate is used in an amount of from 2 to 20 mass % in combination. However, for instance, when head corrosion is caused by a slight amount of chlorine due to dechlorination, it is possible to use polyurethane alone or a combination of polyurethane and isocyanate alone. When polyurethane is used in the present invention, the polyurethane has a glass transition temperature of from −50 to 150° C., preferably from 0 to 100° C., breaking extension of from 100 to 2,000%, breaking stress of from 0.49 to 98 MPa, and a yielding point of from 0.49 to 98 MPa.

Examples of the polyisocyanates which can be used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate D-200, and Takenate D-202 (manufactured by Takeda Chemical Industries, Ltd.), and Desmodur L, Desmodur IL, Desmodur N, and Desmodur HL (manufactured by Sumitomo Bayer Co., Ltd.). These may be used alone or in combinations of two or more thereof taking advantage of a difference in curing reactivity in each layer.

Carbon Black, Abrasive

The examples of carbon blacks for use in the magnetic layer according to the present invention include furnace blacks for rubbers, thermal blacks for rubbers, carbon blacks for coloring, acetylene blacks, etc. Carbon blacks for use in the magnetic layer of the present invention preferably have a specific surface area (S$_{BET}$) of from 5 to 500 m$^2$/g, a DBP oil qabsorption amount of from 10 to 400 ml/100 g, an average particle size of from 5 to 300 nm, pH of from 2 to 10, a water content of from 0.1 to 10 mass %, and a tap density of from 0.1 to 1 g/ml. The specific examples of the carbon blacks for use in the present invention include BLACKPEARLES 2000, 1300, 1000, 900, 905, 800 and 700, and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40, and #10B (manufactured by Mitsubishi Kasei Corp.), CONDUCTEX SC, RAVEN 150, 50, 40 and 15, and RAVEN-MT-P (manufactured by Columbia Carbon Co., Ltd.), and Ketjen Black EC40 (manufactured by Nippon EC Co., Ltd.). Carbon blacks for use in the present invention may be previously surface-treated with a dispersant, may be grafted with a resin, or a part of the surface thereof maybe graphitized before use. Carbon blacks may be previously dispersed in a binder before addition to the magnetic coating solution. These carbon blacks may be used alone or in combination. Carbon blacks are preferably used in an amount of from 0.1 to 30 mass % based on the amount of the ferromagnetic powder. Carbon blacks can serve various functions such as the prevention of static charges, the reduction of a friction coefficient, the impartment of a light-shielding property and the improvement of a film strength. Such functions vary in accordance with the kind of carbon blacks to be used. Accordingly, it is of course possible in the present invention to use these carbon blacks properly by changing the kinds, the amounts and the combinations on the basis of the above mentioned properties such as the particle size, the oil absorption amount, the electroconductivity and the pH value, or these factors should rather be optimized in respective layers. Regarding carbon blacks for use in the magnetic layer of the present invention, for example, the disclosure in *Carbon Black Binran* (*Handbook of Carbon Blacks*) (edited by Carbon Black Association of Japan) can be referred to.

As the abrasives which are used in the present invention, well-known materials mainly having a Mohs' hardness of 6 or more may be used alone or in combination. Examples of such abrasives include α-alumina having an alpha-conversion rate of 90% or more, β-alumina, silicon carbide, chromium oxide, cerium oxide, α-iron oxide, corundum, silicon nitride, silicon carbide, titanium carbide, titanium oxide, silicon dioxide, boron nitride and diamond. Complexes composed of these abrasives (abrasives obtained by surface-treating with other abrasives) may also be used. Compounds or elements other than the main component are often contained in these abrasives, but the intended effect can be attained so far as the content of the main component is 90 mass % or more. Abrasives preferably have a particle size of from 0.01 to 2 μm, and in particular, for improving electromagnetic characteristics, abrasives having narrow particle size distribution are preferred. For improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5 mass %, a pH value of from 2 to 11 and a specific surface area ($S_{BET}$) of from 1 to 30 m²/g. The shape of the abrasives to be used in the present invention may be any of acicular, spherical and die-like shapes. Preferably, the abrasive has a shape partly with edges, because a high abrasive property can be obtained. Specific examples of the abrasives for use in the present invention include AKP-12, AKP-15, AKP-20, AKP-30, AKP-50, HIT-20, HIT-30, HIT-55, HIT-60A, HIT-70, HIT-80, and HIT-100 (manufactured by Sumitomo Chemical Co., Ltd.), ERC-DBM, HP-DBM, and HPS-DBM (manufactured by Reynolds International Inc.), WA10000 (manufactured by Fujimi Kenmazai K.K.), UB20 (manufactured by Uemura Kogyo K.K.), G-5, Kromex U2, and Kromex U1 (manufactured by Nippon Chemical Industrial Co., Ltd.), TF100 and TF140 (manufactured by Toda Kogyo Co., Ltd.), β-Random Ultrafine (manufactured by Ibiden Co., Ltd.), and B-3 (manufactured by Showa Mining Co., Ltd.).

Natural diamonds and artificial diamonds are used as the diamond fine particles in the present invention. Producing methods of artificial diamonds include a static synthesis method such as a method of using graphite, iron, Co and Ni under high temperature and high pressure, or a method of subjecting graphite or furan resin carbon to reaction under high temperature and high pressure, a dynamic synthesis method and a vapor phase synthesis method, and any method can be used in the present invention.

It is industrially possible to secondarily use diamond chips and abrasives after discriminating impurities and washing. The method of the present invention prescribes the distribution of diamond particles. A method of using centrifugal force or a special mesh filter can be used in the present invention to classify diamond particles from a dispersion solution.

Additive

As additives which can be used in the present inven☐tion, additives having a lubrication effect, an antistatic effect, a dispersing effect and a plasticizing effect may be used. Examples of additives which can be used in the present invention include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ether, phenylphosphonic acid, α-naphthylphosphoric acid, phenylphosphoric acid, diphenylphosphoric acid, p-ethylbenzenephosphonic acid, phenylphosphinic acid, aminoquinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or which may be branched), alkoxy alcohols having from 12 to 22 carbon atoms (which may contain an unsaturated bond or which may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

Specific examples of fatty acids for such additives include capric acid, caprylic acid, lauric acid, myristic acid, palmitic acid, stearic acid, behenic acid, oleic acid, elaidic acid, linolic acid, linolenic acid, and isostearic acid. Examples of esters include butyl stearate, octyl stearate, amyl stearate, isooctylstearate, butylmyristate, octylmyristate, butoxyethyl stearate, butoxydiethyl stearate, 2-ethylhexyl stearate, 2-octyldodecyl palmitate, 2-hexyldodecyl palmitate, iso-hexadecyl stearate, oleyl oleate, dodecyl stearate, tridecyl stearate, oleyl erucate, neopentyl glycol didecanoate, and ethylene glycol dioleate, and examples of alcohols for the additives include oleyl alcohol, stearyl alcohol and lauryl alcohol. Of the esters, branched fatty acid esters are more preferably used. Additionally, examples of other additives which may be used include nonionic surfactants such as alkylene oxides, glycerols, glycidols and alkylphenol-ethylene oxide adducts; cationic surfactants such as cyclic amines, ester amides, quaternary ammonium salts, hydantoin derivatives, heterocyclic rings, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols and alkylbetains. The details of these surfactants are described in *Kaimen Kasseizai Binran* (*Handbook of Surfactants*) (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30 mass % or less, more preferably 10 mass % or less.

The lubricants and surfactants for use in the present invention have their respective different physical functions. The kind, amount and proportion of combination generating synergistic effect of the lubricant should be determined optimally in accordance with the purpose. In general, the total amount of the lubricant is from 0.1 to 50 mass %, preferably from 2 to 25 mass %, based on the ferromagnetic powder in a magnetic layer.

All or a part of the additives to be used in the present invention may be added to a magnetic coating solution in any step of the preparation. For example, additives may be blended with a magnetic powder before a kneading step, may be added during a kneading step of a magnetic powder, a binder and a solvent, may be added during a dispersing step, may be added after a dispersing step, or may be added just before coating. According to purpose, all or a part of the additives may be coated simultaneously with or successively after the coating of a magnetic layer for attaining the object. According to the purpose, a lubricant may be coated on the surface of a magnetic layer after the calendering treatment (heating and pressurizing treatment by calender rolls) or after slitting.

Well-known organic solvents can be used in the present invention, for example, organic solvents disclosed in JP-6-68453 can be used.

Layer Constitution

The thickness of the support of the magnetic recording medium of the present invention is generally from 2.5 to 20 μm, preferably from 3 to 15 μm.

An undercoating layer may be provided between the support and the magnetic layer for adhesion improvement. The thickness of the undercoating layer of the present invention is from 0.005 to 0.5 μm, preferably from 0.01 to 0.5 μm.

In the present invention, a backing layer may be provided on the side opposite to the side on which the magnetic layer is provided for the purpose of obtaining antistatic effect and reducing a friction coefficient. The thickness of the backing layer is generally from 0.1 to 2 μm, preferably from 0.3 to 1.5 μm. Well-known undercoating layers and backing layers can be used in the present invention.

The thickness of the magnetic layer of the magnetic recording medium of the present invention can be optimally selected according to the saturation magnetization amount of the head used, the head gap length, and the recording signal zone, and is preferably from 0.03 to 4 μm, more preferably from 0.05 to 3.5 μm.

Backing Layer

The binders described above in the magnetic layer can be used as the binders of the backing layer, and particularly preferred binders are nitrocellulose, a phenoxy resin and polyurethane. Combinations of nitrocellulose with polyurethane and a phenoxy resin with nitrocellulose are particularly preferred, and it is further preferred to use polyisocyanate with these combinations.

The content of a carbon black in the backing layer (the total content when two or more carbon blacks are used in combination) is preferably from 45 to 65 mass parts based on 100 mass parts of the binder.

When a metallic oxide having a Mohs' hardness of from 5 to 9, e.g., α-alumina and α-iron oxide, having an average particle size of from 100 to 210 μm is contained in the backing layer, the backing layer having less dynamic friction coefficient fluctuation and excellent durability can be obtained even when the backing layer is repeatedly rubbed against the tape guide of a recording/reproducing apparatus or the tape guide of a cassette where the magnetic recording medium is encased. The content of a metallic oxide having a Mohs' hardness of from 5 to 9 is from 3 to 20 mass parts based on 100 mass parts of the carbon black.

Support

A support for use in the present invention is preferably a nonmagnetic support. As a nonmagnetic support for use in the present invention, well-known films such as polyesters (e.g., polyethylene terephthalate or polyethylene naphthalate), polyolefins, cellulose triacetate, polycarbonate, polyamide (including aliphatic polyamide and aromatic polyamide such as aramide), polyimide, polyamideimide, polysulfone, or polybenzoxazole can be used. Highly strong supports such as polyethylene naphthalate or polyamide are preferably used. If necessary, a lamination type support as disclosed in JP-A-3-224127 can be used to make different the surface roughnesses of the magnetic layer surface from that of the base surface. The support may be subjected to surface treatments in advance, such as corona discharge treatment, plasma treatment, adhesion assisting treatment, heat treatment, and dust removing treatment.

For attaining the object of the present invention, it is preferred to use the support having a central plane average surface roughness (Ra) of 10.0 nm or less, preferably 8.0 nm or less, more preferably 4.0 nm or less, measured by a surface roughness meter TOPO-3D (a product of WYKO Co., U.S.A.) by MIRAU method. It is preferred that the support not only has a small central plane average surface roughness but also is free from coarse protrusions having a height of 0.3 μm or more. Surface roughness configuration is freely controlled by the size and the amount of fillers added to the support. Examples of such fillers include acryl-based organic fine powders, as well as oxides or carbonates of Ca, Si and Ti. The support for use in the present invention preferably has the maximum height (SRmax) of 1 μm or less, ten point average roughness (SRz) of 0.5 μm or less, central plane peak height (SRp) of 0.5 μm or less, central plane valley depth (SRv) of 0.5 μm or less, central plane area factor (SSr) of from 10% to 90%, and average wavelength (Sλa) of from 5 μm to 300 μm. For obtaining desired electromagnetic characteristics and durability, surface protrusion distribution of the support can be controlled arbitrarily by fillers, e.g., the number of protrusions having sizes of from 0.01 μm to 1 μm can be controlled each within the range of from 0 to 2,000 per 0.1 mm².

The F-5 value of the support for use in the present invention is preferably from 49 to 490 MPa, a thermal shrinkage factor of the support at 100° C. for 30 minutes is preferably 3% or less, more preferably 1.5% or less, and a thermal shrinkage factor at 80° C. for 30 minutes is preferably 0.5% or less, and more preferably 0.1% or less. The support has a breaking strength of from 49 to 980 MPa, an elastic modulus of from 980 to 19,600 MPa, a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less.

Producing Method

Processes of preparing the magnetic coating solution for use in the magnetic recording medium of the present invention comprises at least a kneading step, a dispersing step and, optionally, blending steps to be carried out before and/or after the kneading and dispersing steps. Any of these respective steps may be composed of two or more separate stages. Materials such as a ferromagnetic powder, a nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventionally well-known techniques. Powerful kneading machines such as an open kneader, a continuous kneader, a pressure kneader or an extruder are preferably used in a kneading step. When a kneader is used, a magnetic powder and all or a part of binders (preferably 30 mass % or more of the total binders) are kneading-treated in the range of from 15 mass parts to 500 mass parts per 100 mass parts of the magnetic powder. Details of these kneading are disclosed in JP-A-1-106338 and JP-A-1-79274. When dispersing a magnetic layer solution, glass beads can be used but dispersing media having a high specific gravity is preferably used and zirconia beads, titania beads and steel beads are suitable for this purpose. Optimal particle size and packing density of these dispersing media should be selected. Well-known dispersing apparatuses can be used in the present invention.

A magnetic layer coating solution can be coated on a nonmagnetic support by ordinarily used coating methods, e.g., gravure coating, roll coating, blade coating, and extrusion coating to prepare a magnetic layer.

For manufacturing a magnetic recording medium, it is necessary to strongly orientate a magnetic layer. Orientation is preferably performed using a solenoid of 0.1T or more and a cobalt magnet of 0.2TG or more in combination. It is preferred to appropriately dry a magnetic layer in advance before performing orientation so that the degree of orientation becomes the highest after drying.

Heat resisting plastic rolls, e.g., epoxy, polyimide, polyamide and polyimideamide can be used for calendering treatment. Metal rolls are also usable for calendering treatment. Calendering treatment temperature is preferably from 60 to 150° C., more preferably from 70 to 130° C. Line pressure is preferably from 1,960 to 4,900 N/cm, more preferably from 2,940 to 3,920 N/cm.

Physical Properties

The squareness ratio in the traveling direction of the tape of the magnetic recording medium according to the present invention measured at the magnetic field of $3.97887 \times 10^5$ A/m is preferably 0.70 or more, more preferably 0.80 or more, and most preferably 0.90 or more. The squareness ratios in two directions making right angles with the traveling direction of the tape is preferably 80% or less of the squareness ratio in the traveling direction. SFD of the magnetic layer is preferably 0.6 or less.

The friction coefficient of the magnetic recording medium according to the present invention against a head at temperature of −10° C. to 40° C. and humidity of 0% to 95% is generally 0.5 or less, preferably 0.3 or less, the surface inherent resistivity of the magnetic surface is preferably from $10^4$ to $10^{12}$ Ω/sq, the charge potential is preferably from −500 V to +500 V, the elastic modulus at 0.5% elongation of the magnetic layer is preferably from 980 to 19,600 MPa in every direction of in-plane, the breaking strength is preferably from 98 to 686 MPa, the elastic modulus of the magnetic recording medium is preferably from 980 to 14,700 PMa in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic visco-elasticity measurement at 110 Hz) is preferably from 50° C. to 120° C. If loss tangent is too large, adhesion failure is liable to occur. These thermal and mechanical characteristics are preferably almost equal in every direction of in-plane of the medium with difference of not more than 10%. The residual amount of the solvent in the magnetic layer is preferably 100 mg/m² or less, more preferably 10 mg/m² or less. The void ratio of the magnetic layer is preferably 30 vol % or less, more preferably 20 vol % or less. The void ratio is preferably smaller for obtaining high output but in some cases a specific value should be preferably secured depending on purposes.

The central plane average surface roughness (Ra) of the magnetic layer according to the present invention is as described above. The magnetic layer has the maximum height (SRmax) of 0.5 μm or less, ten point average roughness (SRz) of 0.3 μm or less, central plane peak height (SRp) of 0.3 μm or less, central plane valley depth (SRv) of 0.3 μm or less, central plane area factor (SSr) of from 20% to 80%, and average wavelength (Sλa) of from 5 μm to 300 μm. For obtaining desired electromagnetic characteristics and friction coefficient, the number of surface protrusion of the magnetic layer having sizes of from 0.01 μm to 1 μm can be controlled arbitrarily within the range of from 0 to 2,000 by controlling the surface property due to fillers in the support, the particle size and the amount of the magnetic powders added to the magnetic layer, or by varying the surface shape of rolls of calender treatment. The range of curling is preferably within ±3 mm.

The residual amount of the solvent in the magnetic layer of the magnetic recording medium according to the present invention is preferably 100 mg/m² or less, more preferably 10 mg/m² or less.

EXAMPLE

The present invention will be illustrated in detail with reference to examples below. The components, the ratios, the operation procedures, etc., shown in the following examples can be arbitrarily changed so long as they do not depart from the spirit and scope thereof. Therefore, the present invention is not limited to the specific examples shown in the following examples.

Production of Magnetic Recording Medium

The producing methods of the magnetic recording media according to the present invention (Examples 2, 4, 5, 7, 9 and 10) and the comparative magnetic recording media (Comparative Examples 1, 3, 6 and 8) are described below. The magnetic powder, the amount of fatty acid ester contained in the magnetic layer of the magnetic recording medium of each example and comparative example and calendering conditions of each example and comparative example were changed.

Each component of Composition 1 shown in Table 1 was put in an open kneader and kneaded thoroughly. The mixture was diluted by adding Composition 2, then Composition 3 was added and dispersed thoroughly, and further, Composition 4 was added before coating and mixed and dispersed, thereby each coating solution for forming a magnetic layer was prepared.

On a polyethylene terephthalate support having a thickness of 10 $\mu$m undercoated with a polyester undercoat layer, the above-prepared magnetic layer coating solution was coated in a dry thickness of 3 $\mu$m. The coated layer was orientated in the magnetic field with a 0.3T cobalt magnet and a solenoid while the magnetic layer-forming coating solution was still wet, and then dried.

The characteristics of each magnetic substance are shown below.

Magnetic Substance A:
  Composition: Co/Fe=3 atomic %, Al/Fe=8 atomic %, Y/Fe=2 atomic %
  Hc: 1.28×10$^5$ A/m
  $\sigma_s$: 132 A·m$^2$/kg
  Average long axis length: 0.14 $\mu$m
  Crystallite size: 180 Å
  $S_{BET}$: 48 m$^2$/g Magnetic Substance B:
  Composition: Co/Fe=30 atomic %, Al/Fe=11 atomic %, Y/Fe=7 atomic %
  Hc: 1.38×10$^5$ A/m
  $\sigma_s$: 150 A·m$^2$/kg
  Average long axis length: 0.1 $\mu$m
  Crystallite size: 150 Å
  $S_{BET}$: 48 m$^2$/g Magnetic Substance C:
  Composition: Co/Fe=5 atomic %, Al/Fe=5 atomic %, Y/Fe=0 atomic %
  Hc: 1.33×10$^5$ A/m
  $\sigma_s$: 130 Am$^2$/kg
  Average long axis length: 0.2 $\mu$m
  Crystallite size: 190 Å
  $S_{BET}$: 55 m$^2$/g

TABLE 1

Compositions 1 to 4 for forming magnetic layer coating solutions

| Component | Mass Parts |
| --- | --- |
| Composition 1: | |
| Ferromagnetic Alloy Powder | 100 |
| Vinyl Chloride Copolymer Resin MR110 (manufactured by Nippon Zeon Co., Ltd.) | 10 |
| Polyester-Polyurethane Resin UR 8300 (manufactured by Toyobo Co., Ltd.) | 6 |
| Carbon Black (average particle size: 80 nm) | 2 |
| Phenylphosphonic Acid | 3 |
| Cyclohexanone | 25 |
| Methyl Ethyl Ketone | 35 |
| Composition 2: | |
| Cyclohexanone | 25 |
| Methyl Ethyl Ketone | 65 |
| Composition 3: | |
| α-Al$_2$O$_3$ (average particle size: 0.18 $\mu$m) | 15 |
| Methyl Ethyl Ketone | 15 |
| Composition 4: | |
| Polyisocyanate Coronate 3041 (manufactured by Nippon Polyurethane Co., Ltd.) | 4 |
| Stearic Acid (for industry) | 1 |
| 2-Ethylhexyl Stearate (2EHS) | shown in Table 3 |
| Stearic Acid Amide | 0.2 |
| Toluene | 35 |

A backing layer was coated on the back side surface of the support having a magnetic layer in a dry thickness of 0.6 $\mu$m and dried.

TABLE 2

Composition of backing layer coating solution

| Component | Mass Parts |
| --- | --- |
| Carbon Black Fine Powders BP-800 (average particle size: 17 m$\mu$, manufactured by Cabot Co., Ltd.) | 100 |
| Carbon Black Coarse Powders (thermal black, average particle size: 270 m$\mu$, manufactured by Cancarb Co., Ltd.) | 10 |
| α-Iron Oxide TF100 (average long axis length: 110 nm, Mohs' hardness: 5.5, manufactured by Toda Kogyo Co., Ltd.) | 15 |
| Nitrocellulose Resin | 140 |
| Polyurethane Resin | 15 |
| Polyisocyanate Resin | 40 |
| Polyester Resin | 5 |
| Dispersant: | |
| Copper Oleate | 5 |
| Copper Phthalocyanine | 5 |
| Barium Sulfate | 5 |
| Methyl Ethyl Ketone | 2,200 |
| Butyl Acetate | 300 |
| Toluene | 600 |

Further, smoothing treatment was performed at line pressure of 3,920 MPa/cm, a rate of 200 m/min with calenders of seven stages comprising metal rolls and plastic rolls with varying the metal roll temperature as shown in Table 3. Thus, each laminated product comprising a support having a magnetic layer provided on one side and a backing layer on the opposite side to the magnetic layer was provided. The laminated product was heated at 70° C. for 48 hours to thereby cure the polyisocyanate compound contained in the laminated product. The laminated product was then slit with a slitter to prepare a video tape having a width of ½ inches.

Evaluation of Characteristics of Magnetic Recording Medium

The characteristics of each video tape as prepared above were evaluated in the following manner. The results obtained are shown in Tables 3 and 4 below.

Measuring Method

1. Scratch Depth

The surface of each magnetic layer was scratched to make a streak with a diamond needle using a scratch tester TYPE-HEIDON-14 (a product of SHINTO Scientific Co., Ltd.) and the depth of the scratch was measured using the optical profiler: TOPO-3D (a product of WYKO Co., U.S.A.). The scratching conditions by HEIDON were as follows. Tracer radius: 100 $\mu$mR, tracer load: 15 g and constant, scratching speed: 10 cm/min, scratch length: 10 cm, and environment: 23° C., 50% RH.

Scratch depth was measured by mounting a lens of 40 magnifications on the TOPO-3D, area of 250 $\mu$m×250 $\mu$m was measured with CCD of 256×256 pixel in the vicinity of the central part of the scratch. The average value of peak-valley of eight measured lines was taken as the depth.

2. Surface Lubricant Index

Each sample was divided into two parts. One part (a) was left in the state as it was and the lubricant component was removed from the other part (b) in the manner described later. Surface lubricant index was determined using Auger electron spectroscopic analyzer PHI-660 type (manufactured by Φ Co., U.S.A.). Conditions of measurement were as follows. Primary electron beam accelerating voltage: 3 kV, electric current of sample: 130 nA, magnification: 250 magnifications, inclination angle: 30°. C/Fe ratio was obtained by integrating the values obtained under the above conditions in the region of kinetic energy of from 130 to 730 eV three times and finding the strengths of KLL peak of the carbon (C) and LMM peak of the iron (Fe) as differentials. The strength ratio of (a) to (b) [C/Fe (a)/C/Fe (b)] was obtained and the value was taken as the surface lubricant index.

Removing Method of Lubricant Component:

The removal of a lubricant was performed by immersing a sample (12.5 mm×30 mm) in n-hexane at normal temperature for 30 minutes to extract and remove the fatty acid and fatty acid ester not adsorbed onto the sample. Subsequently, the sample was put in a reaction vessel, 10 ml of n-hexane and 0.3 ml of a silylating agent TMSI-H (HMDS (hexamethyldisilazane) (2)/TMCS (trimethylchlorosilane) (1)/pyridine (10) mixture, manufactured by GL Science Co., Ltd.) were added to the reaction vessel, and the mixture was subjected to deriving reaction with heating at 60° C. for one hour, then the sample was taken out of the vessel and washed with ethanol, dried, and the lubricant component was removed.

3. C/N Ratio

Signals of 33.5 MHz were recorded using D3VTR (D350, manufactured by Matsushita Electric Industrial Co., Ltd.). The noise generated in the range of 33.5 MHz±1 MHz when the signals were reproduced was taken as the standard and the ratio of the reproduced signals to the noise was obtained. The value with Sample No. 1 being 0 dB was obtained.

4. Head Abrasion

Recording and reproduction of a magnetic tape of a length of 90 minutes recording were repeated every roll and ten rolls were run at 21° C., 50% RH using D3VTR (D350, manufactured by Matsushita Electric Industrial Co., Ltd.), and the abrasion value of each head after ten rolls were run was measured and the average value was obtained.

5. Head Staining

In the above measurement of head abrasion, the state of head staining after ten rolls were run was evaluated in five stages (5: little staining→1: heavy staining).

6. Still Durability

The time required for the output to reach −6 dB from the initial value at still state was measured under the environment of 23° C., 10% RH using D3VTR (D350, manufactured by Matsushita Electric Industrial Co., Ltd.), and still durability was expressed in a relative value with the still time of Sample No. 1 as 1.

7. Friction Coefficient

A sample tape was wound onto a stainless rod having a diameter of 4 mm (SUS 420J) at a winding angle of 180°. Tensile force (T2) after 100 pass running of a tape of 100 mm at 23° C., 70% RH, a rate of 3.3 cm/sec was measured and the friction coefficient was obtained according to the following equation:

$$\text{Friction Coefficient} = 1/\pi \cdot \ln(T2/T1)$$

TABLE 3

| No. | Magnetic Substance | Amount of 2EHS (mass parts) | Calender Temperature (° C.) | Scratch Depth (nm) | Surface Lubricant Index (−) |
|---|---|---|---|---|---|
| 1 | A | 1.0 | 80 | 440 | 3.6 |
| 2 | A | 1.2 | 80 | 427 | 5.6 |
| 3 | A | 1.5 | 70 | 472 | 7.8 |
| 4 | A | 1.5 | 80 | 421 | 8.4 |
| 5 | A | 1.5 | 90 | 375 | 8.8 |
| 6 | A | 1.5 | 100 | 360 | 9.2 |
| 7 | A | 1.7 | 80 | 416 | 9.8 |
| 8 | A | 2.0 | 80 | 408 | 11.9 |
| 9 | B | 1.5 | 80 | 430 | 8.6 |
| 10 | C | 1.5 | 80 | 401 | 8.6 |

TABLE 4

| No. | C/N (dB) | Head Abrasion ($\mu$m/30 hr) | Still Durability (−) | Head Staining (−) | Friction Coefficient (−) |
|---|---|---|---|---|---|
| 1 | 2.2 | 0.86 | 1.0 | 4 | 0.22 |
| 2 | 2.4 | 0.3 | 3.1 | 5 | 0.23 |
| 3 | 0.5 | 0.35 | 5.5 | 1 | 0.23 |
| 4 | 2.5 | 0.23 | 4.4 | 5 | 0.25 |
| 5 | 3.0 | 0.2 | 2.6 | 5 | 0.26 |
| 6 | 3.3 | 0.21 | 1.2 | 5 | 0.27 |
| 7 | 2.7 | 0.20 | 4.8 | 4 | 0.26 |
| 8 | 2.9 | 0.18 | 5.4 | 4 | 0.33 |
| 9 | 3.0 | 0.22 | 3.6 | 5 | 0.23 |
| 10 | 0 | 0.35 | 4.6 | 6 | 0.22 |

From the results in Tables 3 and 4, it can be seen that magnetic recording media of Sample Nos. 2, 4, 5, 7, 9 and 10 according to the present invention are excellent in head abrasion resistance, still durability and resistance to staining. Therefore, the present invention can provide a magnetic recording medium having low friction coefficient and excellent running property. On the other hand, it can be seen that comparative samples are insufficient in the improvement of the trade-off of these factors. Further, Sample Nos. 2, 4, 5, 7 and 9, in which magnetic powder having a long axis length of 140 nm or 100 nm is used, are superior in C/N ratio to Sample No. 10 in which a magnetic powder having a long axis length of 200 nm is used.

The magnetic recording medium according to the present invention comprises a support having provided thereon a magnetic layer comprising a ferromagnetic alloy powder with Fe as a main component dispersed in a binder, wherein preferably the average long axis length of the ferromagnetic alloy powder is from 30 to 150 nm, the scratch depth of the surface of the magnetic recording medium is from 370 to 460 nm, and the surface lubricant index of the magnetic recording medium is from 5 to 11. Due to the above constitution, the present invention can provide a video tape excellent in head abrasion resistance, resistance to head staining, still characteristics, running property, and C/N ratio.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth.

What is claimed is:

1. A magnetic recording medium, which comprises:

a support; and at least one magnetic layer comprising a binder, a lubricant and a ferromagnetic alloy powder including Fe, wherein the magnetic recording medium has a surface scratch depth of 370 nm to 460 nm, and has a surface lubricant index of 4 to 11, and the ferromagnetic alloy powder has an average long axis length 30 to 150 nm.

2. The magnetic recording medium as claimed in claim 1, wherein the ferromagnetic alloy powder is dispersed in the binder.

3. The magnetic recording medium as claimed in claim 2, wherein the ferromagnetic alloy powder has a specific surface area (Sbet) of 40 to 80 m$^2$/g, a crystallite size of 80 to 210 Å, an acicular ratio of 3 to 15, and a saturation magnetization: $\sigma_s$ of 100 to 200 A·m$^2$/kg.

4. The magnetic recording medium as claimed in claim 1, wherein the magnetic layer has a central plane average surface roughness (SRa) of 0.5 nm to 5.0 nm.

5. The magnetic recording medium as claimed in claim 1, wherein the magnetic layer has a coercive force (Hc) of 1.11×10$^5$ A/m or more.

6. The magnetic recording medium as claimed in claim 1, wherein the surface lubricant index ranges from 4.5 to 11.

7. The magnetic recording medium as claimed in claim 1, wherein the surface lubricant index ranges from 4.5 to 10.5.

8. The magnetic recording medium as claimed in claim 1, wherein the ferromagnetic alloy powder further comprises at least one selected from the group consisting of Co, Y, Al, Nd and Sm.

9. The magnetic recording medium as claimed in claim 8, wherein the ferromagnetic alloy powder comprises 5 to 35 atomic % of Co, 1.5 to 12 atomic % of Y and 1.5 to 13 atomic % of Al based on Fe.

10. The magnetic recording medium as claimed in claim 1, wherein the binder comprises a vinyl chloride resin, a polyurethane resin and a polyisocyanate.

11. The magnetic recording medium as claimed in claim 10, wherein the binder is contained in an amount of 10 to 30 mass % based on the ferromagnetic alloy powder.

12. The magnetic recording medium as claimed in claim 10, wherein the polyurethane resin has a glass transition temperature of from −50 to 150° C., a breaking extension of from 100 to 2,000%, breaking stress of from 0.49 to 98 MPa, and a yielding point of from 0.49 to 98 MPa.

13. The magnetic recording medium as claimed in claim 1, wherein the magnetic layer further comprises carbon blacks.

14. The magnetic recording medium as claimed in claim 13, wherein the magnetic layer further comprises carbon blacks in an amount of from 0.1 to 30% by weight based on the weight of the ferromagnetic metal powder.

15. The magnetic recording medium as claimed in claim 1, wherein the magnetic layer further comprises at least one abrasive powder selected from the group consisting of α-alumina having an alpha-conversion rate of 90% or more, β-alumina, silicon carbide, chromium oxide, cerium oxide, α-iron oxide, corundum, silicon nitride, silicon carbide, titanium carbide, titanium oxide, silicon dioxide, boron nitride and diamond.

16. The magnetic recording medium as claimed in claim 15, wherein the abrasive powder has a particle size of from 0.01 to 2 μm.

17. The magnetic recording medium as claimed in claim 1, wherein the lubricant is at least one selected from the group consisting of monobasic fatty acids, fatty acid esters, and fatty acid amides.

18. The magnetic recording medium as claimed in claim 17, wherein the magnetic layer contains the lubricant in an amount of from 2 to 25 mass % based on the ferromagnetic alloy powder.

* * * * *